United States Patent
Jensen

(10) Patent No.: US 6,746,326 B2
(45) Date of Patent: Jun. 8, 2004

(54) HYDRAULIC CLUTCH

(75) Inventor: Peter Jensen, Randers (DK)

(73) Assignee: Dronningborg Industries A/S (DK)

( * ) Notice: Subject to any disclaimer, the term of this patent is extended or adjusted under 35 U.S.C. 154(b) by 0 days.

(21) Appl. No.: 10/134,982

(22) Filed: Apr. 29, 2002

(65) Prior Publication Data

US 2003/0203749 A1 Oct. 30, 2003

(51) Int. Cl.⁷ ................................................ A01F 12/10
(52) U.S. Cl. ........................... 460/70; 60/593; 91/420; 91/445; 91/447
(58) Field of Search ..................... 60/593; 91/420, 91/196, 216 R, 445, 447; 460/70

(56) References Cited

U.S. PATENT DOCUMENTS

| | | | |
|---|---|---|---|
| 3,595,271 A | * 7/1971 | Nelson | 137/596.2 |
| 3,685,365 A | 8/1972 | Bauer | |
| 4,235,415 A | * 11/1980 | Heckenkamp | 251/77 |
| 4,286,432 A | * 9/1981 | Burrows et al. | 60/404 |
| 4,471,614 A | * 9/1984 | Hart | 60/562 |
| 4,891,945 A | * 1/1990 | Becker | 60/547.1 |
| 5,960,924 A | 10/1999 | Snyder | |
| 6,523,453 B2 | * 2/2003 | Sedoni et al. | 91/447 |

FOREIGN PATENT DOCUMENTS

DE 199 20 063 5/1999

* cited by examiner

Primary Examiner—Árpád F Kovács
(74) Attorney, Agent, or Firm—MacMillan, Sobanski & Todd, LLC

(57) ABSTRACT

A fluid operated actuator includes a shaft and a housing. The shaft is at least partially mounted in the housing for relative rotation between the shaft and the housing. The shaft includes a substantially central bore in which a first piston is mounted. The shaft also includes a fluid inlet that is connectable to supply of pressurised fluid and a fluid outlet. A conduit is provided for the flow of fluid between the inlet and the outlet. One end of the housing includes a chamber in which there is mounted a valve assembly comprising a second piston and a valve arranged to selectively open or close an inlet to the chamber. Fluid exiting the outlet opens the valve and exerts a force on the second piston, causing movement thereof in a first direction. Upon movement of the first piston towards the second piston, the first piston engages with the valve to open the inlet to the chamber and allow fluid to flow out of the chamber, generating movement of the second piston in a second direction opposite to the first direction.

16 Claims, 5 Drawing Sheets

HYDRAULIC CLUTCH

BACKGROUND OF THE INVENTION

This invention relates an actuator for operating a variator forming part of a transmission, and in particular to combine a harvester comprising such a transmission.

Combine harvesters generally include a threshing drum. In order to provide for the threshing drum to be driven at different speeds a transmission is provided between the engine and the threshing drum. It is desirable to run the combine harvester's engine at a substantially constant speed, and therefore an infinitely variable transmission has been found to be the most effective transmission for transmitting drive from the engine to the threshing drum. Two types of infinitely variable drives are commonly used in combine harvesters to provide drive for the threshing drum. The first is a belt and pulley drive, at least one of the pulleys being in the form of a variator, where the pulley wheel is separated into two halves known as sheaves. The distance between the sheaves can be adjusted in order to change the effective diameter of the pulley, and hence the ratio of the transmission. The second type of infinitely variable drive used is a hydrostatic transmission. The present invention is concerned with transmissions of the variator type.

The sheaves of the variator are moved towards and away from each other by means of a fluid operated actuator (generally hydraulic fluid). A part of the actuator is connected to the variator for rotation therewith. Another part of the variator is held stationary, and is connected to a supply of hydraulic fluid, which when introduced into or removed from the actuator causes the sheaves of the variator to move towards or away from each other. In a known actuator a rotational rubber seal is used to provide a hydraulic seal between stationary and rotating parts. The rubber seal wears and must be replaced. Replacing the seal causes downtime for the combine harvester, which during harvest may be detrimental to the gathering of the crop.

SUMMARY OF THE INVENTION

According to an aspect of the present invention, there is provided a fluid operated actuator including a shaft and a housing. The shaft is at least partially mounted in the housing for relative rotation between the shaft and the housing. The shaft includes a substantially central bore in which a first piston is mounted. The shaft also includes a fluid inlet that is connectable to supply of pressurised fluid and a fluid outlet. A conduit is provided for the flow of fluid between the inlet and the outlet. One end of the housing includes a chamber in which there is mounted a valve assembly comprising a second piston and a valve arranged to selectively open or close an inlet to the chamber. Fluid exiting the outlet opens the valve and exerts a force on the second piston, causing movement thereof in a first direction. Upon movement of the first piston towards the second piston, the first piston engages with the valve to open the inlet to the chamber and allow fluid to flow out of the chamber, generating movement of the second piston in a second direction opposite to the first direction. The invention is also directed to a method by which the described apparatus operates and including method steps for carrying out every function of the apparatus.

BRIEF DESCRIPTION OF THE DRAWINGS

In the drawings, which illustrate a hydraulic actuator assembly for adjusting the distance between sheaves of a variator.

DETAILED DESCRIPTION OF THE PREFERRED EMBODIMENT

Figure 1:
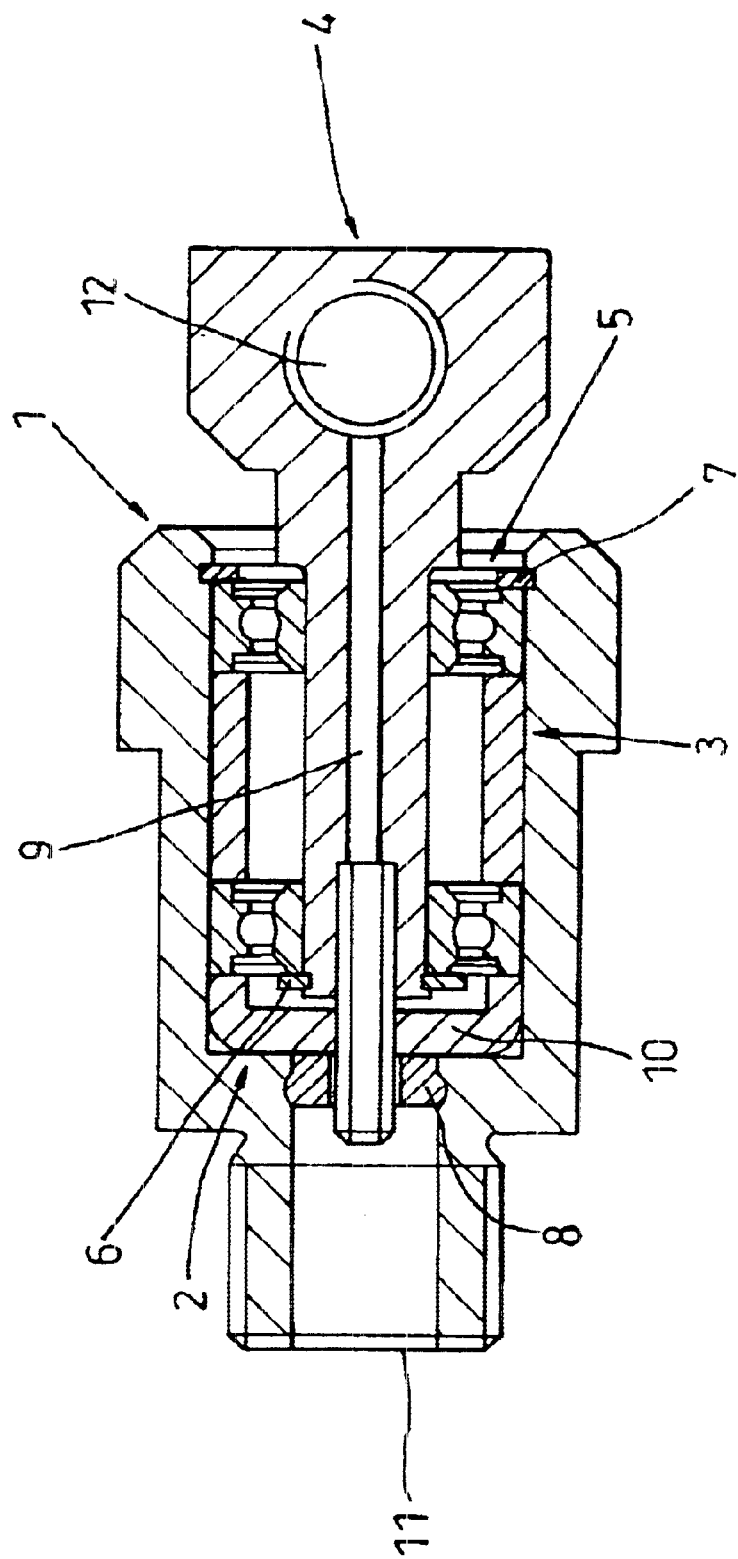
FIG. 1 is a cross-sectional elevation of an actuator of the prior art.

Referring now to FIG. 1, there is illustrated a prior art actuator for moving the sheaves of a variator towards and away from each other. The actuator comprises a shaft 4 which is held stationary, and a housing 1 which rotates about the shaft 4. Rotation between the two parts 4 and 1 is provided for by bearings 6 and 7.

The shaft 4 includes a bore 9 with a tube 10 being inserted in one end thereof. The tube 10 passes through the sleeve 3 which lines the housing 1 and into a chamber 11. A rubber seal 8 is provided between the inner wall 12 of the chamber 11, and the end wall of the liner 3. The seal 8 rotates with respect to the shaft and is stationary with respect to the housing 1.

The actuator functions are as follows: The actuator is fitted to a variator by inserting the housing 1 of the actuator into the end portion 62 of the housing 56 of the variator shown in FIG. 3. Pressurised hydraulic fluid is introduced through the aperture 12, and passes through the bore 9 into the chamber 11. The pressurised hydraulic fluid moves the sheaves of the variator together. The sheaves of the variator are moved apart by drawing pressurised hydraulic fluid out of the chamber 11 through the bore 9 and aperture 12.

Figures 2, 2A:
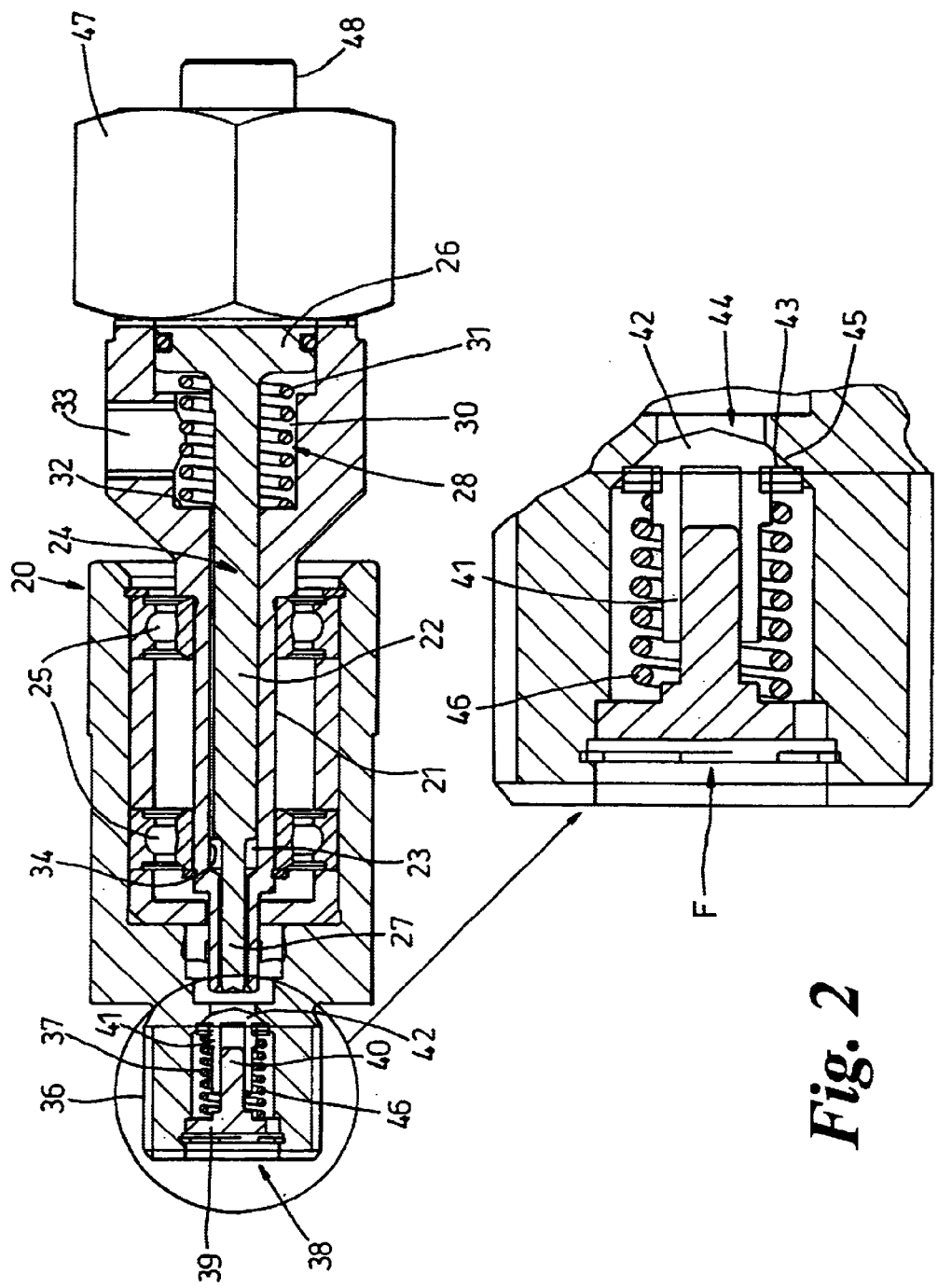
FIG. 2 is a cross-sectional elevation of an actuator according to the invention.
FIG. 2A is an enlarged cross-sectional elevation of the circled portion of the actuator illustrated in FIG. 2.

Referring now to FIGS. 2 and 2A, there is shown a hydraulic actuator according to the invention. Housing 20 is rotatably mounted on a shaft 21 by means of bearings 25. The shaft 21 comprises a bore 23 in which a piston 24 is slidably mounted. The piston 24 comprises a piston rod 22 having a piston head 26 at one end thereof, and a portion of reduced diameter 27 at the other end thereof. The bore 23 in which the piston 24 slides opens out into a cylinder 28, an end region 29 of which receives the piston head 26. The cylinder 28 defines a diameter that is intermediate diameters respectively defined by the bore 23 and the end region 29 of the cylinder 28. A coil spring 31 is located in a region 30 of the cylinder 28. The piston rod 22 passes through the coil spring 31. The coil spring 31 acts on the piston head 26 and an end face 32 of the cylinder 28 to bias the piston 24 into the position shown in FIG. 2.

The shaft 21 comprises a fluid inlet 33 that extends perpendicular to the cylinder 28. The piston rod 22 comprises a flattened surface 34, which co-operates with the bore 23 to provide a conduit through which hydraulic fluid introduced through the inlet 33 and cylinder 28 may pass.

The housing 20 includes a boss 36 at one end thereof. The boss 36 comprises a chamber 37 in which a valve assembly 38 sits. The valve assembly 38 comprises a second piston 39 and a piston rod 40. The piston rod 40 is slidably mounted in a cylinder 41. The base of the cylinder 41 forms a valve 42, which is shown closing off the inlet 44 of the chamber 37. The inlet 44 to the chamber 37 is formed in the end of the bore 23 running through the housing 20. At the point where the valve 42 sits on the inlet 44 to the chamber 37, the bore is chamfered 45 at an angle which matches the angle of a chamfer on the valve 42. Alternatively, the end of the bore may comprise a concave curved surface, with a valve 42 comprising a corresponding convex curved surface to form a sealing closure. A rubber seal 43 is provided on the piston rod 40 behind the valve 42 to ensure sealing between the inlet 44 and the chamber 37 when the valve 42 is in its closed position. A coil spring 46 located in the chamber 37 between the underside of the head of the second piston 39 and the valve 42 serves to force the piston 39 and the valve 42 apart.

The cylinder 28 is closed by an end cap 47 which includes a connector 48 for connection to a supply of hydraulic fluid, such that pressurised hydraulic fluid may be introduced in to the cylinder 28 to exert a pressure on the piston head 26 on the upstream side of the inlet 33. The supply of hydraulic fluid into and out of the chamber 28 is controlled by a suitable hydraulic valve.

The fluid used to operate the actuator may be hydraulic fluid or air.

Figure 3:
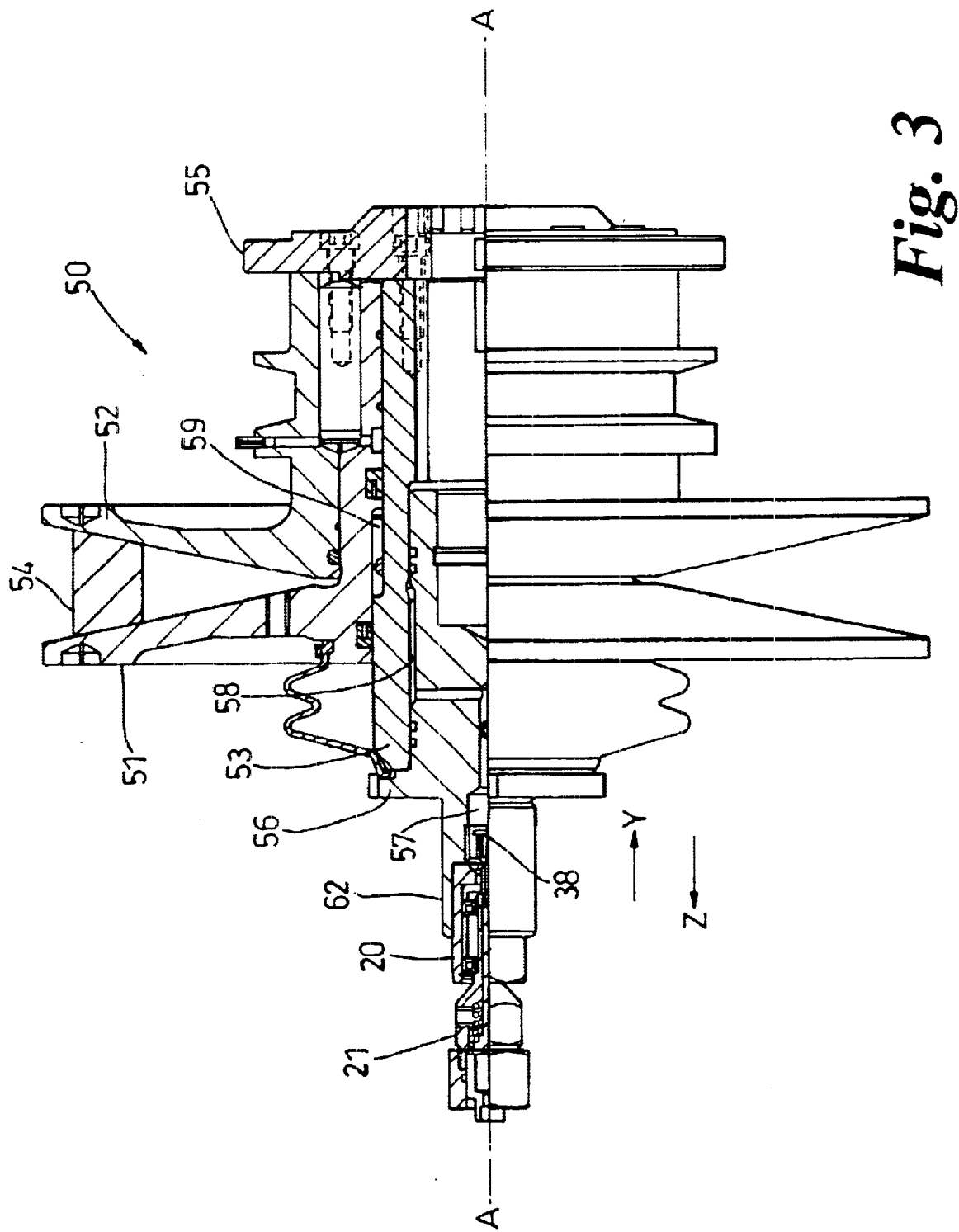
FIG. 3 is a cross-sectional elevation of a variator according to the invention.

Referring now to FIG. 3, there is shown a variator 50. The variator 50 comprises sheaves 51, 52, the sheave 51 being slidably mounted on a shaft 53 which forms a bearing surface, and is slidable thereon towards and away from the sheave 52 thereby changing the distance between the sheaves to adjust the position of the V-belt 54 relative to the central axis A—A of the sheaves, and hence change the drive ratio of the transmission. The sheave 52 is fixed to an end plate 55, and is not moveable relative to the sheave 51.

A housing 56 is inserted into the shaft 53. An end portion 62 of the housing 56 receives the actuator shown in FIG. 2. The housing 20 of the actuator is located in the end portion 62 of the housing 56. The boss 36 of the actuator locates in a chamber 57 in the housing 56, which bore continues to form a conduit through which oil may flow (in the direction indicated by arrow X). The chamber 57 follows a path first in the axial direction of the housing 56 and then perpendicular to the axial direction. The chamber 57, a chamber 59 formed between the shaft 53 and the sheave 51, a connecting chamber 58, formed by an indent in the housing 56 and the internal surface of the shaft 53 are charged with hydraulic fluid.

The sheave 51 is moved towards and away from the sheave 52 by increasing or decreasing the pressurisation of the fluid in the chambers 57, 58 and 59, and the connecting conduits. The actuator shown in FIG. 2 causes this change in pressurisation. As described above with reference to FIG. 2, the result of introducing fluid into the inlet 33 is the introduction of fluid into the chamber 37. This pushes the piston 39 in the direction Y, which compresses the fluid contained in the chambers 57, 58, 59 and their connecting bores, thereby causing movement of the sheave 51 towards sheave 52.

When it is desired to move the sheave 51 away from the sheave 52, fluid pressure is exerted on the piston head 26, thereby moving the piston 24 towards the valve seat 42. The end of the piston rod 22 engages with the valve seat to lift it off its seat. This allows fluid to flow out of the chamber 37, reducing the pressure therein, which in turn causes the piston 38 to move in the direction Z, which causes a reduced pressure in the chambers 57, 58, 59 and the connecting bores, resulting in movement of the sheave 51 away from the sheave 52.

The housing 56, shaft 53, end plate 55 and variator sheaves 51 and 52, together with the housing 20 of the actuator rotate together, whilst the shaft 21 is held stationary.

Figure 4:
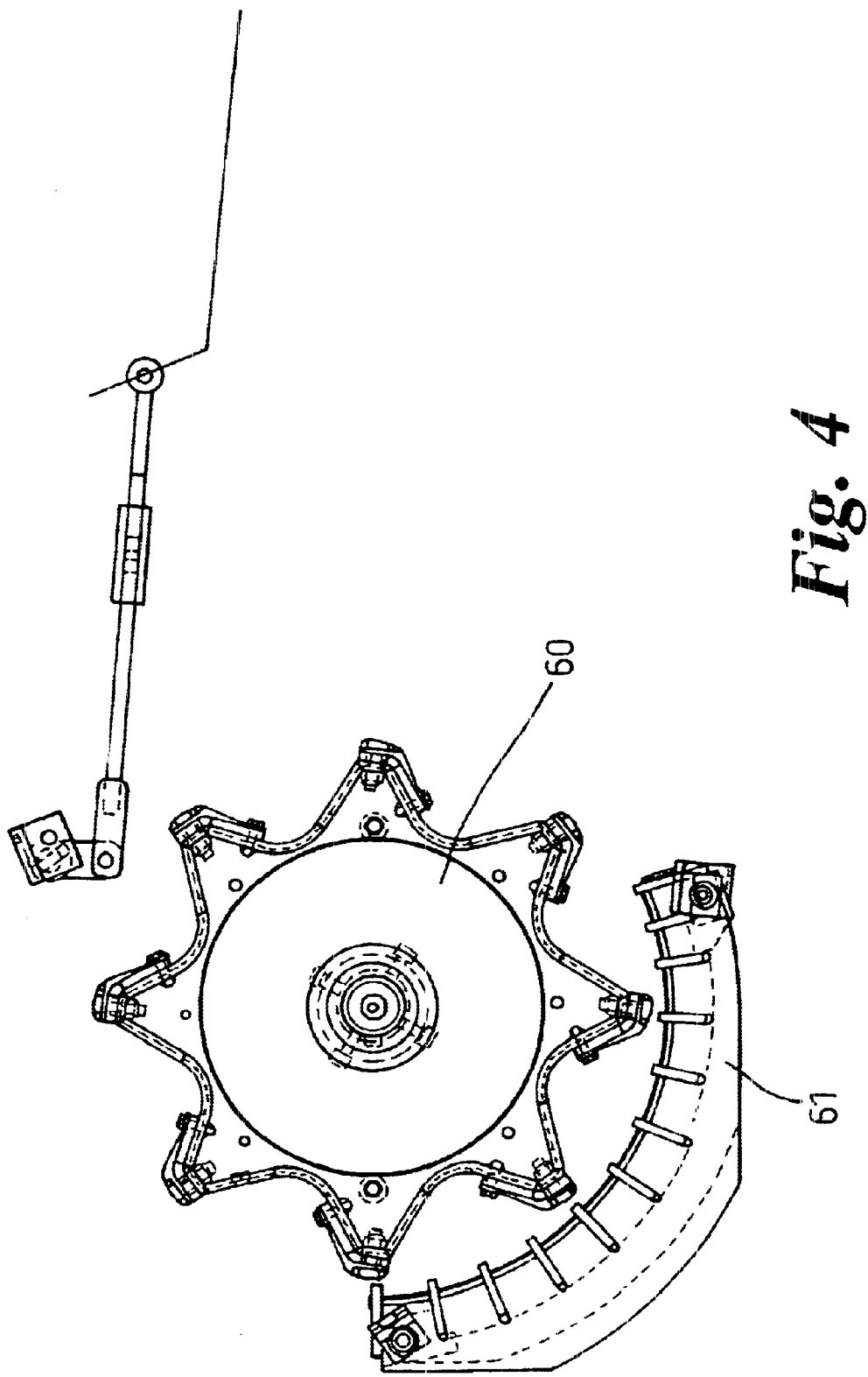
FIG. 4 is a side view of the threshing drum according to the invention.

FIG. 4 illustrates a threshing mechanism comprising a rotatable threshing drum 60 and a concave 61. The threshing drum is driven by a transmission comprising a variator of the type shown in FIG. 3.

Figure 5:
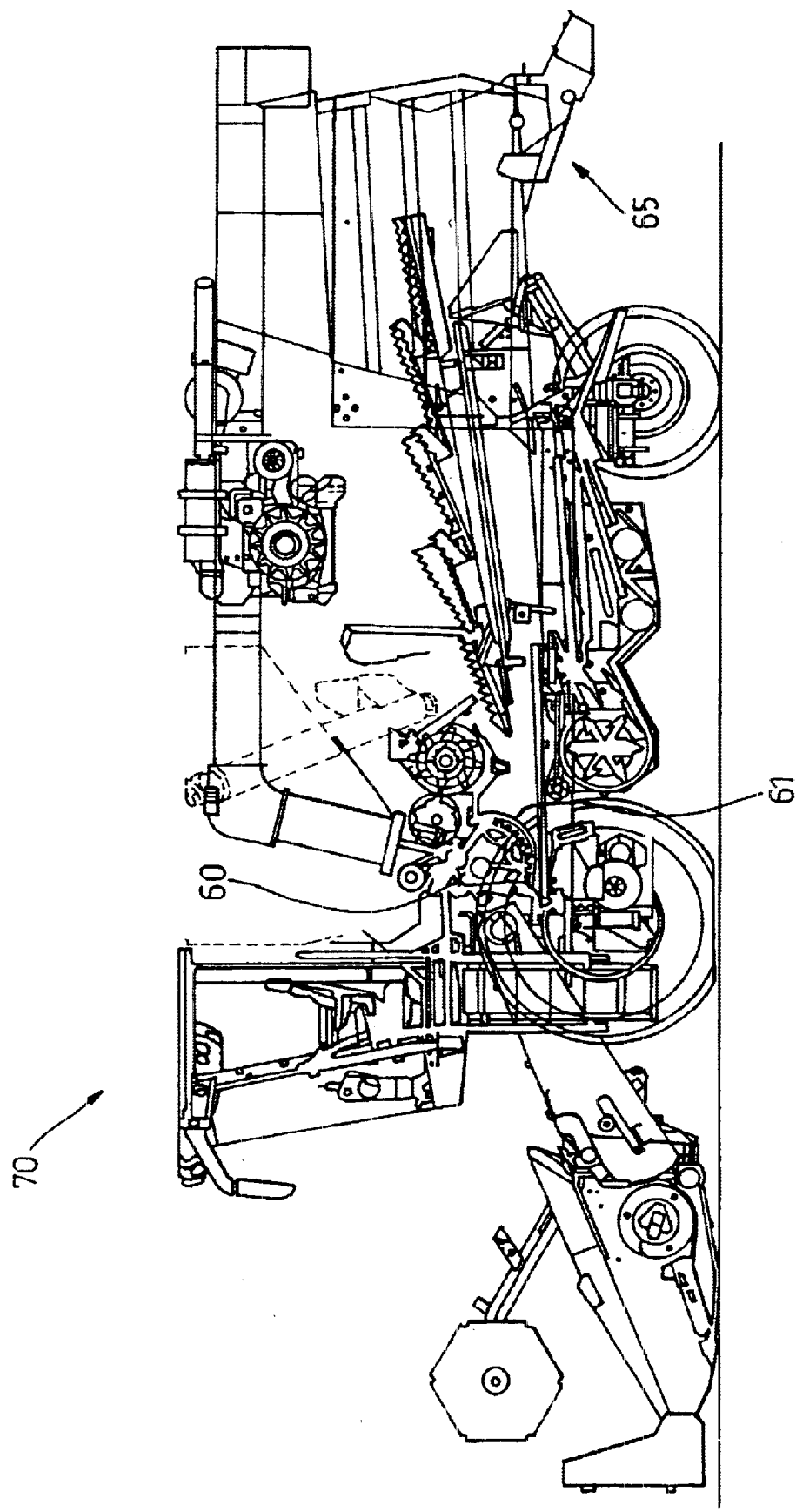
FIG. 5 is a side view of a portion of a combine harvester according to the invention.

FIG. 5 illustrates a combine harvester 70 comprising a threshing mechanism of the type shown in FIG. 4, and driven by a transmission of the type shown in FIG. 3.

The actuator of the invention may be retro-fitted as a replacement part to variators actuated by variators of the type shown in FIG. 1 or other existing actuators. The actuator of the invention may be used in any situation where it is necessary to generate axial movement of a rotating body, not just variators. Similarly, the variator of the invention is not limited to use in threshing machines. For example, on a combine harvester the straw chopper 65 in FIG. 5 may be driven via a variator of the invention.

The actuator and variator of the invention avoid the requirement for a rotary seal. This is particularly advantageous as the wear characteristics of a rotary seal are such the frequent replacement is necessary, resulting in downtime during harvest. Since timeliness is critical during the harvesting season, a modification which avoids downtime is particularly valuable.

What is claimed is:

1. A fluid operated actuator comprising a shaft and a housing said shaft being at least partially mounted in the housing for relative rotation between the shaft and the housing, wherein the shaft comprises a substantially central bore in which a first piston is mounted, the shaft including a fluid inlet connectable to supply of pressurised fluid and a fluid outlet, and wherein a conduit is provided for the flow of fluid between the inlet and the outlet, one end of the housing comprising a chamber in which there is mounted a valve assembly comprising a second piston and a valve arranged to selectively open or close an inlet to said chamber, and wherein fluid exiting the outlet opens said valve and exerts a force on the second piston causing movement thereof in a first direction, and wherein upon movement of the first piston towards the second piston, the first piston engages with the valve to open the inlet to said chamber and allow fluid to flow out of said chamber, generating movement of the second piston in a second direction opposite to said first direction.

2. An actuator according to claim 1, wherein the conduit is formed between the piston and the internal surface of the bore.

3. An actuator according to claim 1, wherein the shaft is stationary and the housing rotates about the shaft.

4. An actuator according to claim 2, wherein one end of the shaft comprises a cylinder, the fluid inlet being arranged in the shaft to deliver fluid into said cylinder.

5. An actuator according to claim 4, wherein one end of the first piston comprises a piston head, and the piston head is slidably mounted in the cylinder.

6. An actuator according to claim 5, wherein a spring is mounted in the cylinder, and acts on a surface of the cylinder and the first piston to bias the first piston in the second said direction.

7. An actuator according to claim 5, wherein the shaft includes a second inlet to said cylinder, the second inlet being connectable to a supply of pressurised fluid, and wherein the piston is moveable in the said first direction under the influence of the pressurised fluid.

8. An actuator according to claim 1, wherein the valve assembly comprises a biasing means to force the second piston and the valve mutually apart.

9. An actuator according to claim 6, wherein the surface of the valve upstream of the second piston comprises chamfered edges, and wherein the inlet to the chamber comprises a bore in the housing, which bore comprises chamfered surfaces corresponding to the chamfered edges of the second piston.

10. An actuator according to claim 1, wherein the second piston comprises a piston rod, and wherein the valve comprises a cylinder in which the piston rod may slide.

11. A variator comprising first and second sheaves, wherein at least one of the sheaves is moveable towards and away from the other sheave under fluid pressure, the variator comprising a housing having mounted therein an actuator as claimed in claim 1, and wherein the housing comprises at least one fluid charged chamber bounded at one end by a sheave of the variator, and at the other end by the second piston of the actuator, and wherein movement of the said second piston in a first direction moves the sheaves of the variator closer together, and movement of the second piston in a second direction opposite to the first direction moves the sheaves of the variator apart.

12. A variator according to claim 11, wherein the fluid filled chamber comprises a series of chambers formed in the said housing and linked by conduits.

13. A variator according to claim 11, wherein moving the second piston towards the sheaves of the variator moves the sheaves towards each other, and moving the second piston away from the sheaves of the variator moves the sheaves away from each other.

14. A variator according to claim 11, wherein the first sheave is fixed in position and the second sheave is moveable towards and away from the first sheave.

15. A variator according to claim 11, wherein the housing of the actuator rotates with the variator, and the shaft of the actuator remains stationary.

16. A threshing mechanism comprising a threshing drum, a source of rotational power, and a transmission for varying the speed of the threshing drum, wherein the transmission comprises a variator comprising variator comprising first and second sheaves, wherein at least one of the sheaves is moveable towards and away from the other sheave under fluid pressure, the variator comprising a housing having mounted therein an actuator as claimed in claim 1, and wherein the housing comprises at least one fluid charged chamber bounded at one end by a sheave of the variator, and at the other end by the second piston of the actuator, and wherein movement of the said second piston in a first direction moves the sheaves of the variator closer together, and movement of the second piston in a second direction opposite to the first direction moves the sheaves of the variator apart.

* * * * *